Figure 1:
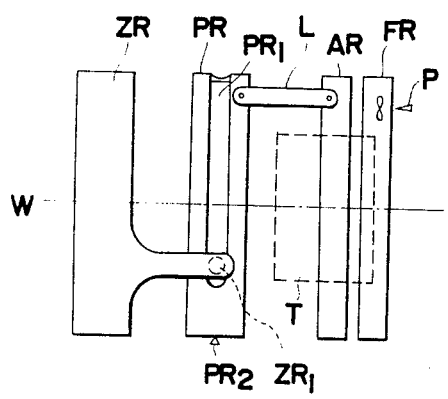
Figure 1:
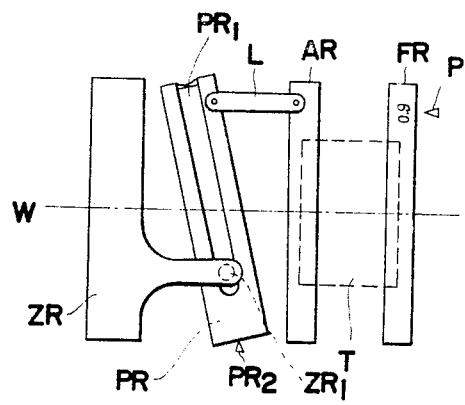

United States Patent
Uesugi

[11] 3,850,507
[45] Nov. 26, 1974

[54] VARIFOCAL LENS ASSEMBLY FOR CAMERA

[75] Inventor: Kyozo Uesugi, Osaka, Japan

[73] Assignee: Minolta Camera Kabushiki Kaisha, Osaka, Japan

[22] Filed: Sept. 10, 1973

[21] Appl. No.: 395,451

[30] Foreign Application Priority Data
Sept. 20, 1972  Japan.............................. 47-94197

[52] U.S. Cl.................. 350/187, 350/255, 354/197
[51] Int. Cl......................... G02b 15/16, G02b 7/10
[58] Field of Search .......... 350/187, 186, 255, 184; 354/197

[56] References Cited
UNITED STATES PATENTS
2,159,394  5/1939  Mellan et al....................... 350/184
3,784,285  1/1974  Watanabe et al................... 350/187

*Primary Examiner*—Paul A. Sacher
*Attorney, Agent, or Firm*—Wenderoth, Lind & Ponack

[57] ABSTRACT

A compact varifocal lens assembly for use in a photographic, motion picture and television camera, which comprises an optical system including at least three lens groups. Focusing can be performed by moving in the axial direction all these lens groups in the same distance in synchronism with each other while zooming can be performed by axially moving two of the lens groups in individually predetermined distances. During this zooming, the rest of the lens groups is also axially moved for compensating for variation of the position of the focal point which may otherwise take place during zooming. To this end, the distant adjusting ring and the zoom control ring are operatively associated through a pivotable ring.

7 Claims, 9 Drawing Figures

(a)

(b)

VARIFOCAL LENS ASSEMBLY FOR CAMERA

The present invention relates to a varifocal lens assembly for use in photographic, motion picture and television cameras and, more particularly, to a zooming and focus control in the varifocal lens by which the focus can be maintained at the same position during zooming operation.

There are two types of varifocal lens system with respect to their focusing methods; one being a front lens group extension type which is to effect focusing by moving forward and backward the foremost lens group independently from the varifocal lens groups, and the other a whole lens extension type which is to effect focusing by moving forward and backward the whole lens groups.

The varifocal lens assembly of whole lens extension type has such advantages, because of a comparatively small front lens group it can employ, that the varifocal lens assembly can be manufactured in light weight and compact size, it displays small variation of aberration in optical images during zooming, and it causes small amount of falloff of luminosity in the circumferential images. On the contrary, it has a drawback in respect of handling in that the adjustment of focus is required each time the zooming has been effected due to the fact that each zooming results in shift of the position of the focal point.

It is therefore an essential object of the present invention to provide an improved varifocal lens assembly of compact size capable of maintaining the picture image in focus all times even during zooming operation effected after focus adjustment has been done.

Another important object of the present invention is to provide an improved varifocal lens assembly of the aforementioned type wherein means for compensating for optical aberration which may otherwise take place during zooming operation is provided.

A further object of the present invention is to provide an improved varifocal lens assembly of the aforementioned type wherein the compensating means is operatively coupled to a focusing ring for focus adjustment.

A still further object of the present invention is to provide an improved varifocal lens assembly of the aforementioned type which can be manufactured at reasonable costs without substantially requiring any complicated step of manufacture.

According to the present invention, the varifocal lens assembly comprises an optical system composed of a front lens group, an intermediate lens group and a rear lens group. During focusing operation, all these lens groups are moved selectively forwards and backwards with respect to the body of a photographic camera depending on positioning of the focus adjustment scale and, during zooming operation, the intermediate and rear lens groups are axially moved in individually predetermined distances relative to each other while the front lens is axially moved, accompanied by the axial movement of said intermediate and rear lens groups, in a predetermined distance depending on the setting of the focus adjustment scale.

For this purpose, a pivotal ring is employed in the varifocal lens assembly whereby the picture image can remain in focus all times during zooming operation effected after the focus adjustment has been done.

Figure 3:
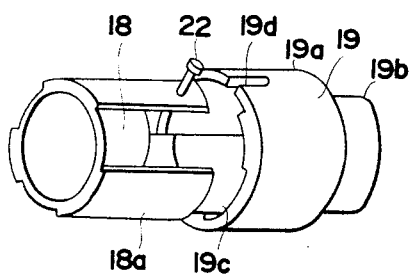
Figure 4:
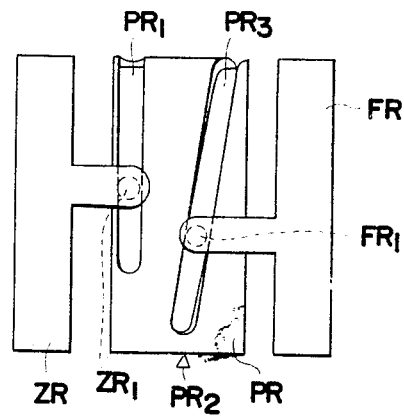
Figure 6:
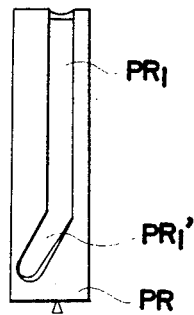
Figure 2:
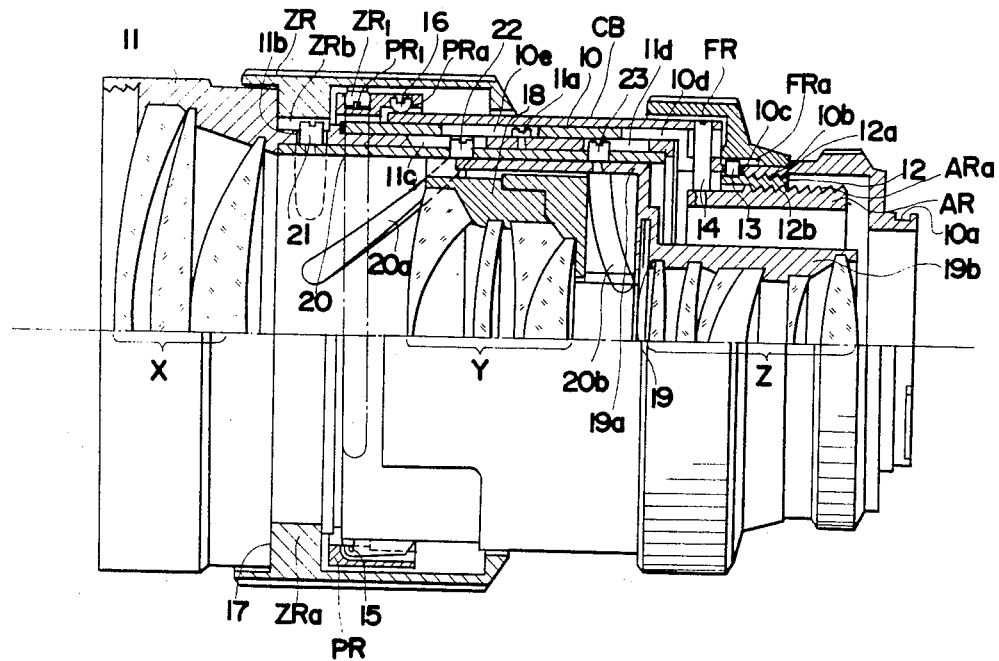
Figure 5:
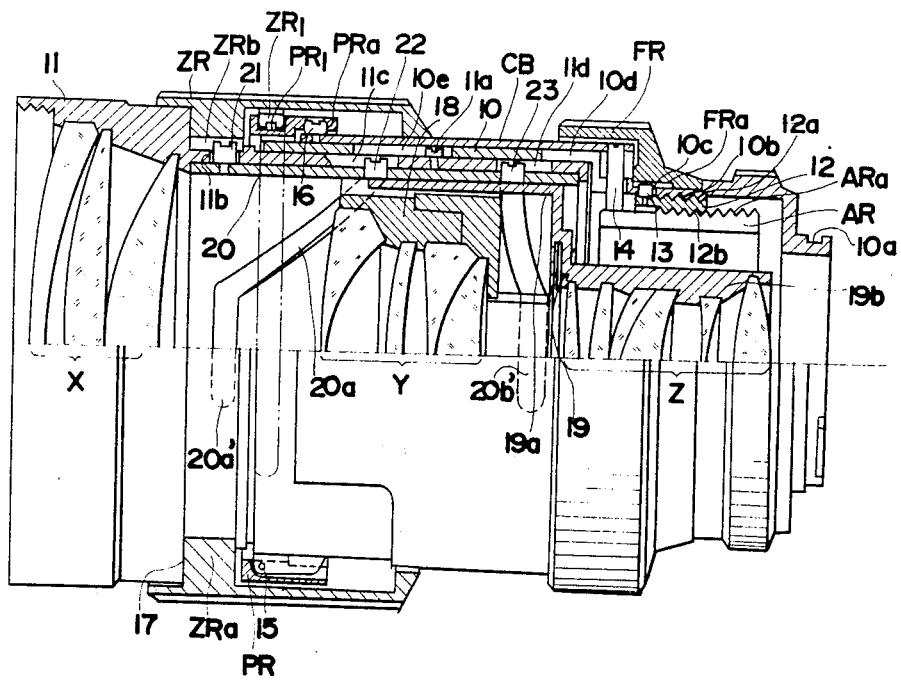
Figure 7:
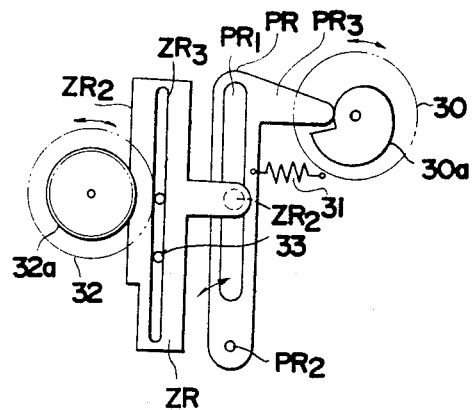
Figure 8:
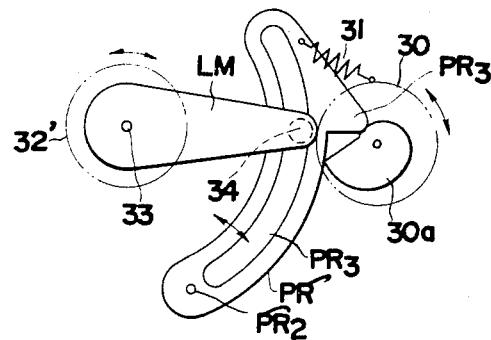
Figure 9:
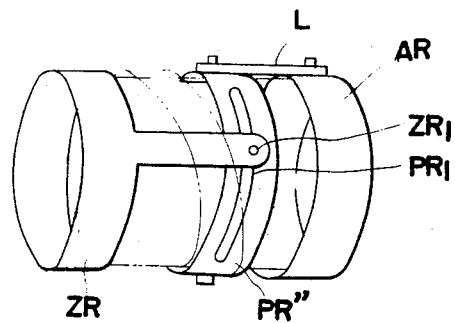

These and other objects and features of the present invention can become apparent from the following description taken in conjunction with preferred embodiments thereof with refererence to the accompanying drawings, in which;

FIG. 1 is a schematic diagram showing the principle of the present invention, wherein FIG. 1(a) illustrates a pivotal ring in one position and FIG. 1(b) illustrates the pivotal ring in another position, FIG. 2 is a longitudinal sectional view, with an upper half broken away, of a varifocal lens assembly according to one preferred embodiment of the present invention, FIG. 3 is a perspective view of first and second lens mounts employed in the varifocal lens assembly, FIG. 4 is a schematic diagram showing another embodiment of the present invention, FIG. 5 is a similar view to FIG. 2, but showing a further embodiment of the present invention, FIG. 6 is a schematic diagram showing the pivotal ring having a cam groove of different shape, which is employed in the varifocal lens assembly of FIG. 5, FIGS. 7 and 8 are schematic diagrams showing different connections between the focusing ring and the zoom control ring, and FIG. 9 is a schematic longitudinal view of the varifocal lens assembly employing the pivotal ring in the form of a flexible band.

Before the description of the present invention proceeds, it should be noted that like parts are designated by like reference numerals throughout the several views of the accompanying drawings.

According to the present invention, a varifocal lens assembly employs independently manually operable rings for zoom control and focusing, respectively, and has an optical system essentially comprising a front lens group X, an intermediate lens group Y and a rear lens group Z, each being in practice composed of a plurality of lens elements. As will become clear from the subsequent specific description, zooming operation can be carried out by rotating the zoom control ring so that the intermediate and rear lens groups Y and Z can be moved in individually predetermined distances in an axial direction with respect to the optical axis of the optical system, with or without accompanying a corresponding axial movement of the front lens group X depending upon the setting of the focusing or distant adjustment ring. On the other hand, focusing operation can be carried out by rotating the focusing ring so that all the front, intermdiate and rear lens groups X, Y and Z can be moved in a predetermined distance in an axial direction with respect to the optical axis of the optical system.

With this in mind, in order that the subsequent specific description of the present invention can be easily understood, reference is first made to FIG. 1, in which the principle of the present invention is schematically illustrated.

Referring now to FIG. 1, it is assumed that the lens groups X, Y and Z are supported by a zoom control ring ZR in such a manner that, when said zoom control ring ZR is rotated about the optical axis W of the varifocal lens assembly, the only pair of the intermediate and rear lens groups Y and Z are axially moved in individually predetermined distances in parallel to the optical axis W and, on the other hand, when said zoom control ring ZR is axially moved in parallel to the optical axis W, all the lens groups X, Y and Z are axially moved in the same predetermined distance. In practice, as will be mentioned later, the zoom control ring ZR is operatively associated with a focusing or distant adjustment ring FR so that, depending on the setting of the focusing ring FR, rotation of the zoom control ring ZR also accompanies an axial movement of the front lens group X in a predetermined distance.

FIG. 1(a) illustrates a condition in which the focusing ring FR is adjusted so that one of the scales engraved on the outer peripheral surface of the focusing ring FR in a known arrangement, which reads "indefinite distance," is registered with a fixed pointer P. In this condition, a pivotal ring PR having a cam groove $PR_1$ formed therein and in which a cam follower $ZR_1$ carried by the zoom control ring ZR is slidably engaged, is held in such a position that the cam groove $PR_1$ extends substantially in parallel relation to the plane of the zoom control ring ZR or the focusing ring FR. Accordingly, if the zoom control ring ZR is rotated about the optical axis, the space between the zoom control ring ZR and the pivotal ring PR does not vary during rotation of said zoom control ring ZR and the only pair of the intermediate and rear lens groups Y and Z can be axially moved for varying the focal length of the varifocal lens assembly.

On the other hand, if the focusing ring FR is rotated about the optical axis W so that another scale, "0.9," on the outer peripheral surface of said focusing ring FR, which means of the distance of 90cm between the focal point of the varifocal lens assembly and a subject to be photographed with a camera equipped with such varifocal lens assembly, is registered with the fixed pointer P as shown in FIG. 1(b), rotation of the focusing ring FR causes an actuating ring AR to axially move through a motion translator T for translating angular motion into linear motion. This axial movement of the actuating ring AR is transmitted to the pivotal ring PR through a connecting link L between said actuating ring AR and said pivotal ring PR whereby the latter can be pivoted about the pivot $PR_2$. Upon pivot of said pivotal ring PR, the position of the cam follower $ZR_1$ within the cam groove $PR_1$ shifts along a curved path whose radius of curvature is substantially equal to the distance between the pivot $PR_2$ and the longitudinal axis of the cam follower $ZR_1$ and, hence, the zoom control ring ZR is axially moved in a predetermined distance which varies depending on the inclination of said pivotal ring PR with respect to the optical axis W. Consequently, all the lens groups X, Y and Z are axially moved in the same distance for focusing purpose.

If the zoom control ring ZR is subsequently rotated about the optical axis W after the condition of FIG. 1(b) has been established, not only the intermediate and rear lens groups Y and Z can be axially moved for varying the focal length of the varifocal lens assembly, but also the front lens group X can be axially moved for compensating for variation of the position of the focal point which may otherwise take place during zooming operation after the focal point has been once adjusted or fixed.

Referring now to FIGS. 2 and 3, in order to practise the aforementioned principle in accordance with the teachings of the present invention, the varifocal lens assembly comprises a fixed barrel 10 having one end formed as at 10a with, for example, a bayonet mount for interchangeable mounting of the varifocal lens assembly to the front of a photographic camera (not shown) in any known manner and a portion adjacent to the other end thereof being relatively axially slidably mounted on a movable barrel 11. For this purpose, the fixed barrel 10 is formed as at 10e with an axially extending guide groove which slidably accommodates therein a pin member 11a secured to, or otherwise integrally formed with, the movable barrel 11. The focusing ring FR is non-axially movably, but rotatably, mounted on the fixed barrel 10 and operatively associated with the actuating ring AR, axially movably housed within the fixed barrel 10, in such a manner as hereinafter described.

Within the space between the fixed barrel 10 and the actuating ring AR, a motion translating ring 12 is axially movably and rotatably held in position. More specifically, as clearly shown in FIG. 2, individual portions of the inner and outer peripheral surface of the fixed barrel 10 and actuating ring AR are threaded as at 10b and ARa in different pitch and both outer and inner peripheral surfaces of the motion translating ring 12 are formed with threaded portions 12a and 12b which respectively engages the threaded portions 10b and ARa. The motion translating ring 12 is rigidly mounted with a guide pin 13 which slidably extends through a helically extending guide slot 10c, formed in the fixed barrel 10, and terminating within an axially extending groove FRa formed in the focusing ring FR. In this arrangement, rotation of the focusing ring FR accompanies corresponding rotation of the motion translating ring 12 about the longitudinal axis thereof while the guide pin 13 is guided along the helically extending guide slot 10c. This helicoidal rotation of the motion translating ring 12 with the guide pin 13 guided along the helically extending guide slot 10c causes the actuating ring AR to axially move.

Alternatively, without employing the mating threaded portions 10b and 12a, the same purpose can be achieved effectively only if the guide slot 10c, that has been described as helically extending, is made to extend in parallel relation to the plane transverse of the optical axis of the varifocal lens assembly.

The link L shown in FIG. 1 may be in practice employed in the form of a connecting barrel shown by CB in FIG. 2. This connecting barrel CB is axially slidably mounted on the fixed barrel 10 and has one end rigidly connected with the actuating ring AR by means of a connecting pin 14 for axial movement together with said actuating ring AR. For this purpose, the fixed barrel 10 is formed as at 10d with an axially extending slot through which said connecting pin 14 loosely extends.

The pivotal ring PR pivoted as at 15 to the front end portion of the fixed barrel 10 has one end overlapping the connecting barrel CB and the other end substantially surrounding the fixed barrel 10 in spaced relation to said barrel 10. This pivotal ring PR is formed as at PRa with a bearing recess which receives therein a ball joint 16 rigidly secured to the connecting barrel CB whereby axial movement of said connecting barrel CB causes the pivotal ring PR to pivot about the pivot 15 in such a way as to divert the longitudinal axis thereof from the optical axis of the varifocal lens assembly. However, it should be noted that, so long as the focusing ring FR is set to read the "∞" or "indefinite" position which means that the distance between the focal plane in the photographic camera and a subject to be photographed is indefinite in terms of the focus adjustment scale, the longitudinal axis of the pivotal ring PR remains in alignment with the optical axis of the varifocal lens assembly.

The pivotal ring PR is also formed with the cam groove $PR_1$ which receives the cam follower $ZR_1$. This cam follower $ZR_1$ is employed in the form of a ball member rigidly secured to the inner peripheral surface of the zoom control ring ZR axially movably and rotatably mounted in alignment with the optical axis of the varifocal lens assembly. The zoom control ring ZR is integrally formed with a radially inwardly extending projection ZRa slidably contacting the outer periphery of the movable barrel 11 as at 17 so that axial movement of the zoom control ring ZR caused upon pivot of the pivotal ring PR can be transmitted to the movable barrel 11 for permitting the latter to correspondingly move.

While the front lens group X is rigidly mounted at the front of the movable barrel 11, the intermediate and rear lens groups Y and Z are mounted in such a manner as hereinafter described.

As clearly shown in FIG. 3, the varifocal lens assembly further comprises a first lens mount 18 having a plurality of leg portions 18a integrally formed with said lens mount 18 on the outer peripheral surface thereof in equidistantly spaced relation to each other and each extending in parallel relation to the longitudinal axis of said lens mount 18, and a second lens mount 19 composed of a large diameter portion 19a and a reduced diameter portion 19b. The large diameter portion 19a of the lens mount 19 is formed on the inner peripheral surface thereof with keyways 19c provided in number corresponding to the number of the leg portions 18a for slidably receiving therein said leg portions 18a, respectively. From the foregoing, it has now become clear that the lens mount 18 and 19 are in telescopically movable relation to each other and does not undergo a relative rotation with respect to each other.

The intermediate lens group Y is stationarily held in position within the first lens mount 18 and the rear lens group Z is stationarily held in position within the reduced diameter portion 19b of the second lens mount 19, as clearly shown in FIG. 2. During zooming operation, i.e., during rotation of the zoom control ring ZR, these intermediate and rear lens groups Y and Z axially move in a predetermined functional relation with respect to each other and in different distances. For this purpose, a rotary barrel 20 is rotatably received within the movable barrel 11 and partially situated between said movable barrel 11 and the large diameter portion 19a of the second lens mount 19.

This rotary barrel 20 is rotatable together with the zoom control ring ZR and, for this purpose, a pin member 21 having one end rigidly connected to said rotary barrel 20 extends through an circumferentially extending slot 11b, formed in the movable barrel 11, and terminating within an axially extending groove ZRb formed in the zoom control ring ZR. The rotary barrel 20 is formed with a pair of cam grooves 20a and 20b which helically forwardly and rearwardly extends, respectively, with respect to the optical axis of the varifocal lens assembly. Slidably engaged in these grooves 20a and 20b are cam followers 22 and 23, respectively. The cam follower 22, which may be in the form of a pin member, has one end rigidly secured to the first lens mount 18, a substantially intermediate portion of which loosely extends through an axially split portion 19d, formed in the large diameter portion 19a of the second lens mount 19 as best shown in FIG. 2. Likewisely, the cam follower 23, which may be in the form of a pin member, has one end rigidly secured to the large diameter portion 19a of the second lens mount 19. Clearance openings 11c and 11d are formed in the movable barrel 11 for accommodating therein respective portions of the cam followers 22 and 23, that have projected beyond the rotary barrel 20, without interferring movement of said cam followers 22 and 23.

Although the rotary barrel 20 is rotatable about the longitudinal axis thereof or the optical axis of the varifocal lens assembly in accordance with rotation of the zoom control ring ZR, it can also move in the axial direction accompanied by the axial movement of the movable barrel 11 because the width of the slot 11b is substantially equal to the diameter of the pin member 21. The axial movement of the rotary barrel 20 thus effected is in turn transmitted to the first and second lens mounts 18 and 19 respectively through the cam followers 22 and 23 and, consequently, it is clear that the intermediate and rear lens groups Y and Z can be axially moved in the same distance as the distance of axial movement of the front lens group X.

From the foregoing description, it has now become clear that rotation of the focusing ring FR for focus adjustment causes the front, intermediate and rear lens groups X, Y and Z to axially move in the same distance in synchronism with respect to each other whenever the zoom control ring ZR is positioned, that only the intermediate and rear lens groups are axially moved in different distances depending on the shapes of the cam grooves 20a and 20b upon rotation of the zoom control ring ZR while the focusing ring FR is set to read the "indefinite" position and that, while the focusing ring FR is set to read other than the "indefinite" position, not only rotation of the zoom control ring ZR causes the intermediate and rear lens groups Y and Z to axially move in different distances depending on the shapes of the cam grooves 20a and 20b for varying the focal length of the varifocal lens assembly, but also it causes the front lens group X to axially move in a predetermined distance depending on the inclination of the cam groove $PR_1$ of the pivotal ring PR relative to the plane transverse of the optical axis of the varifocal lens assembly for compensating for variation of the position of the once-adjusted focal point, which may otherwise take place upon relative axial movement of the intermediate and rear lens groups Y and Z while the front lens group X remains stationarily.

FIG. 4 illustrate another example of connection between the focusing ring FR and the pivotal ring PR. In this example of FIG. 4, the motion translating ring 12, actuating ring AR and connecting barrel CB and their associated parts, which have been described as employed in the foregoing embodiment of FIGS. 2 and 3, are not employed. Instead thereof, the pivotal ring PR is formed with a helically extending guide $PR_3$ while the focusing ring FR is provided with a cam follower as at $FR_1$, which is slidably engaged in the helically extending guide $PR_3$. In this arrangement, rotation of the focusing ring FR causes the pivotal ring PR to pivot about the pivot $PR_2$, i.e., as at 15 in FIG. 2, due to the fact that the cam follower $FR_1$ pushes the pivotal ring PR during rotation of the focusing ring FR. This arrangement of FIG. 4 is advantageous in that the construction of the varifocal lens assembly according to the present invention can be facilitated.

Referring now to FIGS. 5 and 6, only the difference between the embodiment of FIGS. 2 and 3 and the embodiment of FIGS. 5 and 6 resides in the shape of each of the cam grooves $PR_1$, 20a and 20b, respectively, formed in the pivotal ring PR and the rotary barrel 20. The embodiment of FIGS. 5 and 6 is particularly advantageous in that the varifocal lens assembly can be utilized in close-up photography. To this end, as clearly shown, while the cam grooves 20a and 20b are respectively shaped to have individual linear grooves 20a' and 20b' each extending at right angles to the optical axis of the varifocal lens assembly, the cam groove $PR_1$ in the pivotal ring PR is also shaped to have a linear groove $PR_1'$ as shown in FIG. 6 which extends in an inclined relation to the plane transverse of the optical axis even if said pivotal ring PR is pivoted with the cam groove $PR_1$ diverging from the plane transverse of the same optical axis. Close-up photography with this varifocal lens assembly can be performed merely by rotating the zoom control ring ZR, irrespectively of the position of the focusing ring FR, while the cam followers 22 and 23 are relatively engaged in the linear grooves 20a' and 20b' in which condition the cam follower $ZR_1$ carried by the zoom control ring ZR is situated within the linear groove $PR_1'$.

More specifically, assuming that the cam followers 22 and 23 are relatively situated within the respective cam groove extensions 20a' and 20b' and, hence, the cam follower $ZR_1$ is situated within the cam groove extension $PR_1'$ after the zoom control ring ZR has been rotated beyond either the maximum focal length position or the minimum focal length position, subsequent rotation of the zoom control ring ZR with the cam follower $ZR_1$ situated within the cam groove extension $PR_1'$ causes the zoom control ring ZR to axially move while rotating about the optical axis, the axial movement of which is in turn transmitted to the movable barrel 11. Therefore, it is clear that, upon axial movement of the movable barrel accompanied by the axial movement of the zoom control ring ZR, all the lens groups X, Y and Z can be axially moved in the same distance, in a substantially similar way as afforded when the focusing ring FR is rotated while the axial distance between the intermediate and rear lens groups Y and Z remains the same.

FIGS. 7 and 8 illustrate separate arrangements by which the concept of the present invention can be advantageously applicable to a photographic camera of such a type as having a focus adjustment knob 30 rotatably carried by the body of the photographic camera (not shown). In this case, the focus adjustment knob 30 should have an eccentric cam 30a coaxial with said focus adjustment knob 30.

In the example of FIG. 7, the pivotal ring PR is formed with a tongue portion $PR_3$ and biased about the pivot $PR_2$ by a tension spring 31 so as to render the tip of the tongue portion $PR_3$ in sliding contact with the eccentric cam 30a whereby rotation of the focus adjustment knob 30 causes the pivotal ring PR to pivot against the tension spring 31. The zoom control ring ZR having the cam follower $ZR_1$ engaged in the cam groove $PR_1$ as hereinbefore described with reference to FIG. 1 has one end extremity remote from said cam follower $ZR_1$ formed into a straight gear as indicated by $ZR_2$, said straight gear being constantly meshed with a geared wheel 32a which is coaxial with a zoom control knob 32 rotatably carried by the movable barrel 11 together with said geared wheel 32a.

In this arrangement of FIG. 7, it is clear that, if the pivotal ring PR is pivoted in the manner as hereinbefore described, the zoom control ring ZR can be axially moved, the axial movement of said zoom control ring ZR being in turn transmitted to the movable barrel 11 through the zoom control knob 32 thereby causing said movable barrel 11 to correspondingly move in the axial direction.

Rotation of the zoom control knob ZR can be effected by rotating the zoom control knob 32 in which case the rotation of said knob 32 can be transmitted to the zoom control ring ZR through the geared engagement between the geared wheel 32a and the straight gear $ZR_2$. For preventing an excessive rotation of the zoom control ring ZR, a guide groove or slot $ZR_3$ is formed on the inner peripheral surface of the zoom control ring ZR which cooperates with a pair of spaced stopper pins 33. Focusing can be performed by rotating the focus adjustment knob 30 in any known manner.

In the arrangement shown in FIG. 8, the employment of the zoom control ring ZR shown in FIG. 7 is omitted. Instead thereof, the pivotal ring PR may be employed in the form of an arched plate member. This pivotal ring PR in the arrangement of FIG. 8 pivots in a similar manner as in the arrangement of FIG. 7 when the focus adjustment knob 30 is rotated. The pivotal movement of the pivotal ring PR can be transmitted to the zoom control knob 32' which, in this case, is designed and arranged so as to move the intermediate and rear lens groups Y and Z in individually predetermined distances for varying the focal length upon rotation of said zoom control knob 32', through a link member LM having one end connected to a spindle 33, about which said zoom control knob 32' rotates, and the other end formed with a cam follower 34 engaged in the cam groove $PR_1$.

From the foregoing full description of the present invention, it has now become clear that an image of the subject to be photographed, which is viewed through the camera viewfinder, remains in focus at all times whenever the focal length of the varifocal lens assembly according to the present invention varies. Accordingly, readjustment of the focal point usually performed after the zoom control has been effected is not required in the varifocal lens assembly of the present invention.

Although the present invention has been fully described in conjunction with the various preferred embodiments thereof, it should be noted that numerous changes and modifications are apparent to those skilled in the art. By way of example, as shown in FIG. 9, the pivotal ring PR, while it is made of a solid cylindrical member in the foregoing embodiments, may be made of a flexible band PR" having one end pivotally connected to the link L and the other end pivotally connected to the fixed barrel 10, said flexible band PR" being curved to conform to the curvature of the fixed barrel 10. Preferably, this flexible band PR" is made of a metallic material sufficiently hard to twist about its own longitudinal axis, but sufficiently deformable in the widthwise direction. In operation, upon axial movement of the actuating ring AR and, hence, the link L, the flexible band PR" is deformed as indicated by chain lines and, therefore, it is clear that the same object as hereinbefore described can be achieved without any reduction in performance.

Accordingly, such changes and modifications should be understood as included within the true scope of the present invention unless otherwise they depart therefrom.

What I claim is:

1. A varifocal lens assembly for use in association with photographic, motion picture and television cameras which comprises:

an optical system including at least three coaxially arranged lens groups;

a fixed barrel having one end adapted to be detachably coupled to the front of the camera;

a first mounting stationarily carrying a first one of said lens groups and axially movable in relation to said fixed barrel;

a second mounting stationarily carrying a second one of said lens groups and capable of undergoing rotary and axial movement;

a third mounting stationarily carrying the rest of said lens groups and capable of undergoing rotary and axial movement;

a distant adjusting ring;

a zoom control ring;

pivotal means pivotable in response to rotation of said distant adjusting ring, said zoom control ring being operatively associated with said pivotable means such that pivotal movement of said pivotable means causes said zoom control ring to axially move; and means capable of undergoing rotary and axial movement and operatively associated with said first to third mountings in such a manner that, when said zoom control ring is thus moved in the axial direction, all of said mountings can be axially moved in the same predetermined distance in synchronism with each other thereby permitting said first to third lens groups to perform the focusing operation and, when said zoom control ring is manually rotated, said second and third mountings are axially moved in indivudially predetermined distances for varying the focal length of said varifocal lens assembly, said first mounting being axially moved in response to rotation of said zoom control ring, only when said pivotable means is pivoted, for compensating for variation in the position of the focal point that has been fixed by rotating said distance adjusting ring so that the picture image remains in focus all times during zooming operation.

2. A varifocal lens assembly as claimed in claim 1, further comprising means for transmitting a rotary motion of said distant adjusting ring to said pivotal means for causing the latter to pivot upon rotation of said distant adjusting ring.

3. A varifocal lens assembly as claimed in claim 2, wherein said transmitting means includes a motion translating ring coaxially mounted relative to the distant adjusting ring for rotation together with said distant adjusting ring, an actuating ring threadably inserted within said motion translating ring for axial movement according to rotation of said motion translating ring, and a linkage connecting between said pivotal means and said actuating ring.

4. A varifocal lens assembly as claimed in claim 2, wherein said transmitting means includes a helically extending cam groove formed in said pivotal means and a cam follower supported by said distant adjusting ring whereby rotation of said distant adjusting ring causes the cam follower to push said pivotable means, while the same is guided along said cam grooves, thereby pivoting said pivotable means.

5. A varifocal lens assembly as claimed in claim 1, wherein said pivotal means comprises a pivotal ring pivotally connected to andmounted on the fixed barrel and formed therein with a circumferentially extending groove and wherein said zoom control ring is provided with a cam follower engaged in said cam groove whereby pivotal movement of said pivotal ring causes said zoom control ring to axially move, said cam follower of said zoom control ring travelling within said cam groove when said zoom control ring is rotated.

6. A varifocal lens assembly as claimed in claim 5, wherein said cam follower in said zoom control ring comprises a ball member secured to the inner peripheral surface of said zoom control ring.

7. A varifocal lens assembly as claimed in claim 5, wherein said cam groove includes a cam groove extension continued from one end of said cam groove thereby enabling the whole lens groups to be axially moved upon rotation of said zoom control ring, while said cam follower is situated within said cam groove extension, to enable a close-up photography regardless of the rotation of the distant adjusting ring.

* * * * *